(12) United States Patent
Rising et al.

(10) Patent No.: US 7,817,870 B2
(45) Date of Patent: Oct. 19, 2010

(54) METHOD AND APPARATUS FOR IMAGE PROCESSING WITH COLOR CONSTANCY (75) Inventors: Hawley K. Rising, San Jose, CA (US); Farhan Baqai, Fremont, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1306 days.

(21) Appl. No.: 11/336,038

(22) Filed: Jan. 20, 2006

(65) Prior Publication Data
US 2007/0172139 A1     Jul. 26, 2007

(51) Int. Cl.
*G06K 9/46*     (2006.01)

(52) U.S. Cl. .................. 382/249; 382/232; 382/233
(58) Field of Classification Search ................ 382/232, 382/233, 240, 274, 167, 249; 345/589
See application file for complete search history.

(56) References Cited

U.S. PATENT DOCUMENTS 7,359,572 B2 *  4/2008  Liu et al. .................... 382/274

* cited by examiner

*Primary Examiner*—Anh Hong Do
(74) *Attorney, Agent, or Firm*—John P. O'Banion (57) ABSTRACT

Fractal decompression and the Retinex algorithm are combined to produce a color constancy method. By using this approach, color constancy and image compression can be achieved simultaneously.

31 Claims, 6 Drawing Sheets

METHOD AND APPARATUS FOR IMAGE PROCESSING WITH COLOR CONSTANCY

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image compression and decompression, and more particularly to fractal image compression and decompression, and most particularly to obtaining color constancy during the decompression of fractally compressed images.

2. Description of Related Art

Data compression may generally be defined as processes of transforming information from one representation to another, smaller representation from which the original data, or a close approximation thereto, can be recovered by the complementary processes of data decompression. The compression and decompression processes are often referred to as coding and decoding. Techniques for compressing digital image data include MPEG, MJPEG, JPEG, DCT, PNG, wavelet, and fractal.

The storage and transmission of large amounts of data are often facilitated by the use of compression and decompression techniques. In particular, the transmission and storage of visual images involves large amounts of data, and benefits greatly from image compression and decompression techniques. However, when compressed image data is decompressed to output on a display device or printer or other output device, problems can result. One problem is to ensure color constancy among the images produced on different displays or other output devices.

Scene lighting conditions cause two major problems or limitations in color images compared to the direct human observation of the scenes. First, there is a comparative loss of detail and color in shadow zones of images captured by both photographic and electronic cameras. This is the dynamic range problem. Second, changes in the spectral distribution of the illumination source cause color distortions in the images. This is the color constancy problem.

Electronic cameras (e.g., based on CCD detector arrays) can acquire image data across a wide dynamic range. This range is typically wide enough to handle most illumination variations within scenes, and camera adjustments can usually handle illumination variations from scene to scene. However, this range is usually lost when the image is digitized or when the image is output to a printer or display, which has a much more limited dynamic range.

The color constancy problem typically arises from the spectral differences between daylight and artificial lighting. Different film and/or filters can be used to try to compensate, but these do not provide any dynamic range compression, and cause detail and color in the shadows to be lost or severely attenuated compared to what a human observer would actually see.

The development of image processing systems has been at the heart of the recent digital image revolution. These systems process captured digital images to enhance their clarity and details using sophisticated image processing algorithms, resulting in images that are substantially more detailed and accurate than previously. However, a substantial difference remains between an image perceived by a person and an image captured and reproduced on a display. Despite improvements in digital image processing systems, they still cannot reproduce images with the same level of detail, color constancy, and lightness, as a human perceives. This is due in part because the human eye has a greater dynamic range compression than current digital image systems. Dynamic range compression refers to the ability to distinguish varying levels of light. The human eye has a dynamic range compression of about 1000:1, which means that the eye can distinguish about 1000 levels of light variation. By contrast, digital image systems typically use 8 bits/pixel, which allows for a dynamic range compression of only 256:1.

Current technologies for creating, storing, and display of electronic images must be duplicated for the various end displays, due to differences in resolution, dynamic range, and color gamut. This is currently overcome by choosing from a set of images on server equipment, or by resizing the image when displayed. Usually, a completely separate image must be processed to do anything about the dynamic range at all.

The rendering format for a device consists of the height and width of a rendered image, and it's color gamut or "dynamic range". Different formats are appropriate to different rendering devices, such as a large dynamic range and color gamut for a CRT, a large dynamic range and height and width for an HDTV device, and a very large height and width, but smaller dynamic range and color gamut for printed media.

BRIEF SUMMARY OF THE INVENTION

The present invention is directed to an image processing method and apparatus that produces an output having a single format (e.g., rendering format, which consists of the height and width of the rendered image, and it's color gamut or "dynamic range") that can be used anywhere (e.g., on any display or other output device). It combines the well-known properties of fractal compression to resize images with the dynamic range manipulation of retinex. According to the invention, retinex processing is combined with the decoding of fractally compressed images. The images are compressed using any typical fractal encoding algorithm, but with the compression in the color directions set for a slower convergence decode. The decode algorithm is replaced by one in which range blocks are averaged down and then combined with the domain block by averaging in, using the range block values and difference as one part of the average, and the existing domain block as the other. The compression and decompression algorithms are performed on the logarithm of the image, taking the anti-log at the end of the decompression to render the image again. When this algorithm is iterated, the effect is that it converges in space to the image, and slowly converges on the color as with the retinex algorithm, and therefore can be used to create images of desired dynamic range. Since fractal decompression can be used to create images of desired size, this algorithm gives complete control of the images to match the resolution and dynamic range of any display device or printer.

An aspect of the invention is a method for obtaining an image and processing the image by a combination of retinex processing and fractal compression and decompression techniques. The method also includes encoding the image to produce a compressed image; and decoding the compressed image to produce a decompressed image. The method further includes compressing the image by a compression algorithm which combines retinex processing with fractal compression to produce a compressed image; and decompressing the compressed image by a decompression algorithm which combines retinex processing with fractal decompression to produce a decompressed image of a desired dynamic range and size.

Another aspect of the invention is an apparatus having a processor with an associated memory, including program instructions, which when executed by the processor, cause the processor to process an image by a combination of retinex processing and fractal compression and decompression techniques, and data used to process the image. The apparatus also includes an encoder programmed to compress an image by a combined retinex and fractal compression algorithm; and a decoder programmed to decompress the compressed image by a combined retinex and fractal decompression algorithm. An image processor includes means for obtaining an image; means for processing the image by a combination of retinex processing and fractal compression and decompression techniques; and means for outputting the processed image.

A still further aspect of the invention is a machine readable medium containing instructions, which when executed by a machine, cause the machine to perform operations comprising processing an image by a combination of retinex processing and fractal compression and decompression techniques; and outputting the processed image.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus, flowcharts, and images generally shown in FIGS. 1A-B through FIGS. 8A-B. It will be appreciated that the apparatus may vary as to configuration and as to details of the parts, and that the method may vary as to the specific steps and sequence, without departing from the basic concepts as disclosed herein.

Color is inherently 3-dimensional. One approach to the present invention is to handle the color as three planes, and associated with each plane is a third dimension of color intensity. Another is to handle the three color dimensions simultaneously, in which case the intensity dimension becomes a 3-dimensional vector. These dimensions are herein referred to as "the intensity", which means the color directions, regardless of how they are handled.

Introduction

Fractal decompression and the Retinex algorithm are combined in the invention to produce a new color constancy method. By using this approach, color constancy and image compression can be achieved simultaneously. While the juxtaposition of color constancy, a topic which involves negating the effects of lighting and changes in dynamic range, with fractals, a topic usually identified with dynamic systems or image compression, may seem unlikely to one skilled in the art, the present invention shows that this is not the case. According to the invention, a fractal decompression algorithm is easily converted into an algorithm for color constancy, by combining it with the retinex algorithm, and even such a discontinuous mapping can effect a change in dynamic range that makes sense to the eye.

The invention has two main components, which are individually known, but are combined in a unique way to produce unexpected results. The Retinex algorithm is a method for approaching color constancy. There are two published types; the invention uses the algorithm known as McCann'99. The invention also uses a fractal compression and decompression algorithm. The two algorithms are put together to produce the present invention.

The invention uses fractal compression techniques. Fractal compression replaces the original image with a function. This function consists of contracting the image, usually by 2:1 in each spatial dimension and by p:1 for p>1 in the color dimensions (done separately for each color plane). Because the method does not use pixels, but rather image blocks as its basic unit, these blocks can be of any of a fairly large variation of sizes, allowing the image to be zoomed or reduced. That much has been done before in the prior art, e.g. by Iterated Systems, Inc.

The new method of the present invention allows control over the color dimensions. First of all, the function used to average each image block with its target is modified. Then the number p is reduced to be closer to one. In fact p can be chosen equal to one, but this works slowly, so a slightly larger number is chosen. This assures that the components of the function converge at a more suitable rate (spatially faster than color domain-wise). The averaging step assures that the color domain function contains discontinuous diffusion. Consequently, the image converges to an image that can be different in size, and different in the application of color. Since the method gives complete control over the image display, it can be used to show the same content on different displays or other output devices.

This invention might also be used to provide touch-up and nonlinear editing for images. It is also possible to use it to correct for bad lighting or noisy transmission of images by contracting the image and encoding it, then decoding to get rid of noise, while adjustment of the convergence rate corrects for the lighting.

Possible variations include the following:

(a) Changes in the rates of convergence to produce different photographic results.

(b) Use of different decode algorithms, specifically "pixel chaining," to produce different diffusion results.

(c) Changes in the implementation of the compression strategy that explicitly forecast this decompression method.

(d) Use of the variability of size and color rendering to compare images in a database of images.

The Retinex Algorithm

The Retinex algorithm, developed originally by Land and McCann, is an algorithm for calculating the proper lightness of each pixel in an image. The principle on which it is based is that parts of the image, due to accommodation, are seen as certain colors based on their contrast with nearby image elements. Consequently, there is no fixed color that is perceived as green, only a fixed relationship to the surrounding colors. Retinex algorithms are described in B. Funt, F. Ciurea, and J. McCann, "Retinex in Matlab," Journal of Electronic Imaging 13, pp. 48-57, January, 2004, which is herein incorporated by reference.

The algorithm is run on the logarithm of the image, which models the change in image strength on the surface of the retina. To model the lateral connections between cells in the retinal ganglia, a random path starting farther away from a given pixel is sampled, and the differences between the pixels in the path are summed. Whenever this sum gets higher than a maximum threshold, it is replaced by the threshold value.

Consequently, image pixels are calculated as distances down from this value in luminance. This modeling gives an accommodation of decreasing influence as the path gets further from the pixel being calculated. This algorithm, which is close to the original Retinex, is called the Frankle-McCann algorithm. If this is repeated for each pixel in the image, it is not difficult to see that information about the surround of each pixel is incorporated in its choice of pixel value.

Another way to effect the Retinex algorithm, dubbed McCann'99, takes each pixel, and averages it with its immediate neighbor minus the original difference between the two pixels.

Once again, if the result surpasses a pre-ordained maximum, it is reset to the maximum. The choice of which neighbor to average is varied randomly as the algorithm is iterated. The image is averaged down in succession until it is a minimum size, and this average is replaced with the maximum. The algorithm proceeds for a fixed number of iterations, then the result is interpolated up to the next size, and the algorithm repeats. This version of the algorithm is a diffusion modified by a non-linear reset operation at each level of iteration.

It has been shown that either algorithm, if carried to an infinite number of iterations, will converge to a shifted copy of the log of the original, corresponding to a scaling of the original image after the anti-log is taken. [see D. Brainard and B. Wandell, "An analysis of the Retinex theory of color vision," Journal Optical Society of America A 3, pp. 1651-1661, October, 1986; and H. K. Rising III, "Analysis and generalization of retinex by re-casting the algorithm in wavelets," Journal of Electronic Imaging 13, pp. 93-99, January, 2004.] In the case of the McCann'99 algorithm, the reset operation ensures that all image elements converge to an image in which each pixel is as far from the chosen maximum as the pixel was in the original image from the brightest point in the image.

Basic Fractal Image Compression

Fractal image compression is a procedure in which an image is encoded as a set of affine formulas. Each block of the image is matched with the decimation, both in size and in intensity, of a larger block from the image, up to the difference in the block averages. The affine transformation required to map the larger block to the image block is recorded as part of the compressed file. Together, this set of transformations forms a mapping of the image into itself. Because each part of this transformation is a contraction, the whole transformation is a contraction mapping, in the space of images. [For general reference to fractal compression, see N. Lu, Fractal Imaging, and M. Barnsley, with Hawley Rising, Fractals Everywhere, 2nd ed.]

The space of images can, and frequently is, endowed with a metric.

This is done every time one calculates rate-distortion curves to measure the quality of a compression technique. Among the possible choices of metrics are the $L^p$ metrics, like the Manhattan distance and Euclidean distance, or other more exotic choices like Hausdorff distance, or Mahalanobis distance. In the present invention, the Euclidean or $L^2$ distance is used, but others, particularly the Hausdorff distance or the $L^1$ distance, were also used. The decimation method used is the average of each 2×2 block, but other size blocks could also be used.

The simplest algorithm for fractal compression, then, goes as follows:

1. Decimate a copy of the image, multiplying each new pixel by the coefficient chosen for contracting the intensity value.

2. For each square block in the original image (4×4 blocks were used) search the possible 4×4 blocks of the decimated copy and find the best match. The criterion for best match will be the smallest square error between the two blocks. (The decimation process takes each 2×2 block of pixels and averages or chooses from them a single pixel. The 4×4 blocks are used to match blocks of the original to blocks of the decimated image to do the fractal transform, after the replacement of the 2×2 blocks by individual pixels (decimation) has been done.)

3. For each square block in the original image, save the affine map:

Save the location of the square matched, the location of the square found to match it, and the difference in the averages of the two matched blocks.

The decompression algorithm is much simpler and less time consuming:

1. Starting from a blank screen (it doesn't really need to be blank, one can start with some other picture if one likes), for each block in the image, retrieve the block in the same image, and shrink it both spatially and in intensity in each of the color planes, add the difference in average, and replace the current block.

2. Iterate the above step sufficiently long for the image to converge.

Because not all the matches are going to be exact, this is a lossy compression algorithm. It converges to the image as it is mapped in the compression stage, that is, the image as it would look if all the matches found replaced the original pixels. Working with 4×4 blocks, an image of reasonable size takes quite a long time to compress. Running 10 to 20 iterations on the decompression should suffice, and this is done in the blink of an eye. There are known methods for making the compression faster, as well as making the decompression faster, and there are various other types of improvements to the process that can also be used [e.g., see N. Lu, Fractal Imaging, Academic Press, MA, 1997, which is herein incorporated by reference].

Combining the Two Algorithms

It should be noted that were one to start with a blank screen, and modify the iterations of the fractal decompression algorithm to average with the target block, instead of replacing it, the algorithm must still converge. Iterating enough times, the succession of averages converges to the replacement. Consequently, the algorithm that one would normally use for the McCann'99 Retinex, that of averaging with the neighbor of a pixel, is replaced by averaging with a pixel from a "similar part" of the image. As in the McCann'99, the process will start with the screen at maximum intensity, and as in McCann'99, the process will work entirely on the logarithm of the image, rather than the image values themselves.

There is one more part to include: The nonlinear reset. This can be effected by resetting any pixels that surpass the maximum during mapping. The diffusion that is now obtained is potentially very discontinuous. The invention is diffusing information about the coloring of a pixel among pixels that resemble a contraction of its neighborhood. As in the McCann'99 algorithm, the invention is again setting pixels by their distance from the brightest point in the image, but this time the image will converge inexorably, with enough iterations, to the original, as it has been programmed to do by the compression algorithm. The invention can adjust the rate of convergence spatially compared to the rate of convergence in intensity (in each of the 3 color planes, or of the 3 dimensional color vector) only by modifying the compression amount in the intensity direction that is used to compress and decompress the image.

Finally, the algorithm used is as follows (the compression and decompression algorithms are performed on the logarithm of the image, taking the anti-log at the end of the decompression to render the image again):

Compression

1. Take the logarithm of the whole image. (The image or its three color planes are replaced by the logarithm of the image, by taking the logarithm of the intensity either separately, or as the logarithm of each component of the color vector.)
2. Create the screen for matching: Decimate the logarithm of the image by a factor of two in each direction, and apply the contraction value in the intensity direction. (The intensity here again is in each of the logarithms of the three color planes, or in the vector intensity of the logarithm of the 3-dimensional color vector.)
3. Match all the blocks in the original image to this screen, and record the mapping.
4. Save this in a file so it can be recovered. This is important since sophisticated algorithms are not being used for creating this record, so it will take a long time. It is better to have the file around to utilize while examining the decompression algorithm.

Figure 1A:
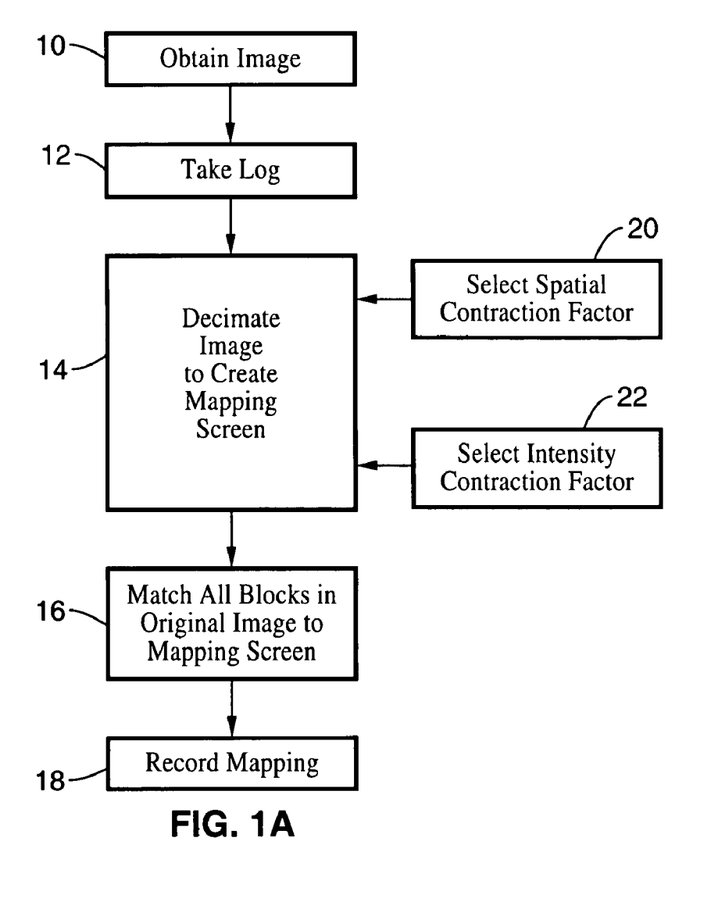
FIG. 1A is a flowchart of a retinex/fractal image compression algorithm of the present invention.

The combined retinex/fractal compression algorithm of the invention is illustrated in the flowchart of FIG. 1A. An image is obtained, step 10, either by taking the image with an imaging device, e.g. camera, or receiving a transmitted image or retrieving it from storage. The logarithm of the whole image is taken, step 12. The log of the image is decimated to create the mapping screen, step 14. The decimation step is controlled by the selection of the spatial contraction factor (q, typically 2), step 20, and the intensity contraction factor (p), step 22. All the blocks in the original image are matched to the mapping screen, step 16, to produce the compressed image. The compressed image (mapping) is recorded, step 18, e.g. stored in a file in a computer memory.

Decompression

1. Set the decoding screen to the maximum value.
2. Decompress each block by averaging the contracted block with what is there.
3. If necessary, reset any pixels that have passed the maximum value.
4. Iterate 2 and 3 until the image converges spatially and in color.
5. Take the anti-log of the result to display the image.

Figure 1B:
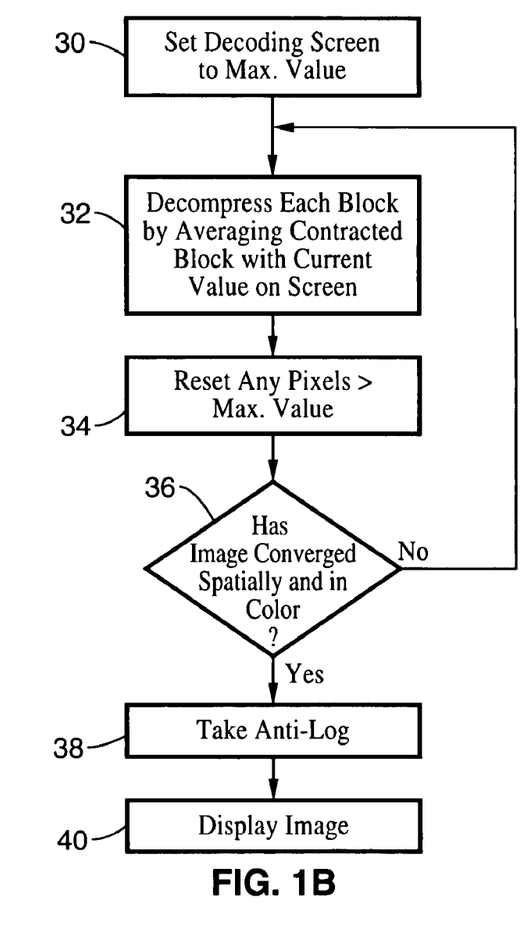
FIG. 1B is a flowchart of a retinex/fractal image decompression algorithm of the present invention.

The combined retinex/fractal decompression algorithm of the invention is illustrated in the flowchart of FIG. 1B. The decoding screen is set to the maximum value, step 30. Each contracted block of the compressed image is averaged with the current value on the screen, step 32, to decompress each block. Any pixels that have passed the maximum value are reset, step 34. The spatial and color convergence of the image is determined, step 36. If the image has not converged spatially and in color, the algorithm returns to step 32. The loop from step 36 to step 32 is repeated until the image has converged spatially and in color. The anti-logarithm is then taken, step 38, to produce the decompressed image, which is displayed, step 40, or otherwise output or stored.

Apparatus

Figure 2A:
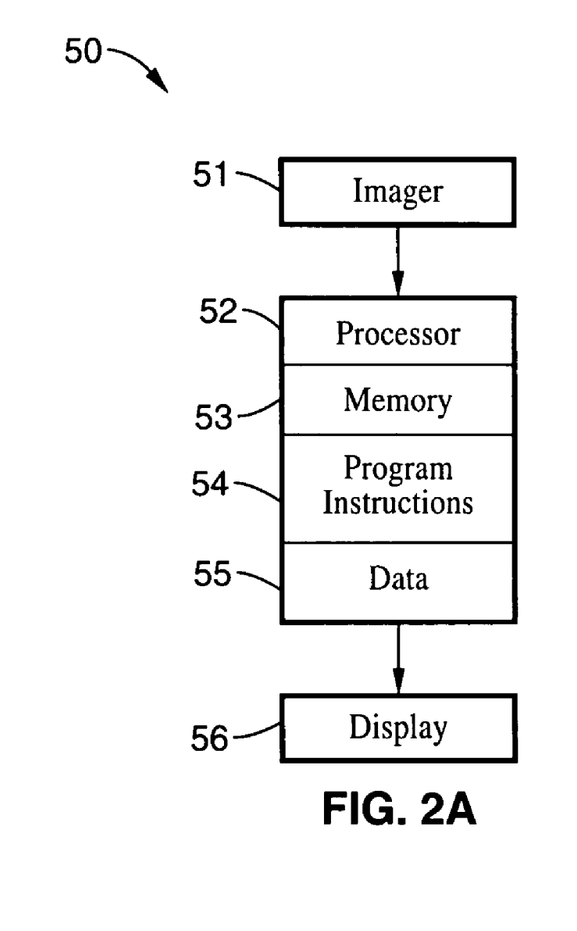
FIGS. 2A and 2B are block diagrams of apparatus for carrying out the present invention.
Figure 2B:
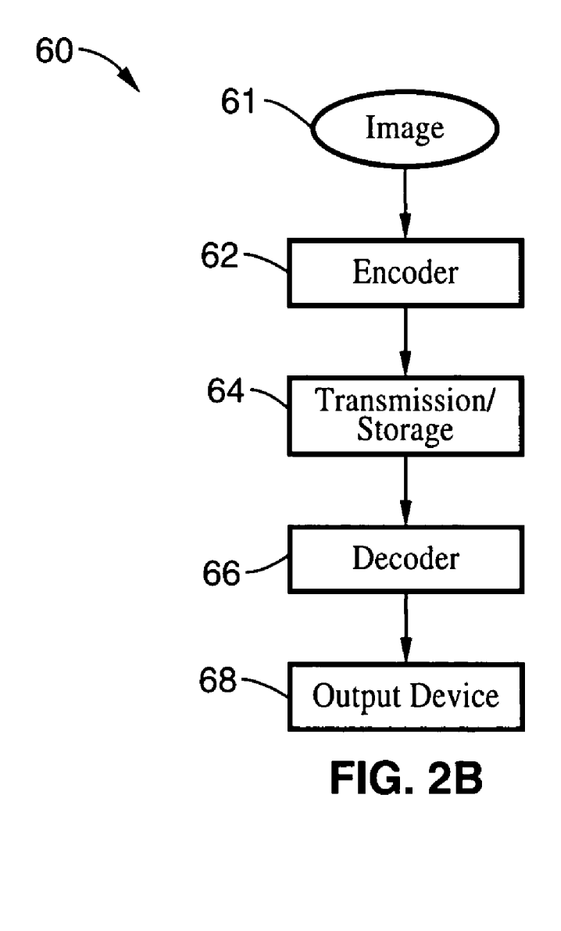

FIGS. 2A-B illustrate an apparatus to carry out the invention. System 50 of FIG. 2A utilizes an image taken with an imager 51, e.g. a camera. The image may have been previously taken and received by transmission or retrieved from storage instead of taken directly from imager 51. The image is input into a processor, e.g. digital computer, 52. Memory 53 is associated with processor 52, and includes program instructions 54 and data 55. Program instructions 54 are the instructions, which when executed by processor 52, cause the processor to carry out the algorithms of the invention. Data 55 may include data used in the processes, and may include a previously stored compressed image produced by processor 52 from a previously input image that was compressed, and will be decompressed later. Data 55 may also include a compressed image that was obtained from another source and will be decompressed later. Processor 52 uses the program instructions 54 and data 55 in associated memory 53 to produce a decompressed image that is output to display device 56 or to another output device, e.g. printer, or storage device.

System 60 of FIG. 2B utilizes an image 61, which is input to an encoder 62. Encoder 62 is programmed to carry out the compression of the image, by the combined retinex/fractal compression algorithm. The compressed image from encoder 62 is either transmitted or stored, as represented by the transmission/storage element 64. The compressed image is input into decoder 66. Decoder 66 is programmed to carry out the decompression of the compressed image, by the combined retinex/fractal decompression algorithm. The decompressed image from decoder 66 is then output to output device 68. Encoder 62 and decoder 66 are processors similar to processor 52, and may be combined into a single machine 52.

Results

Figure 3A:
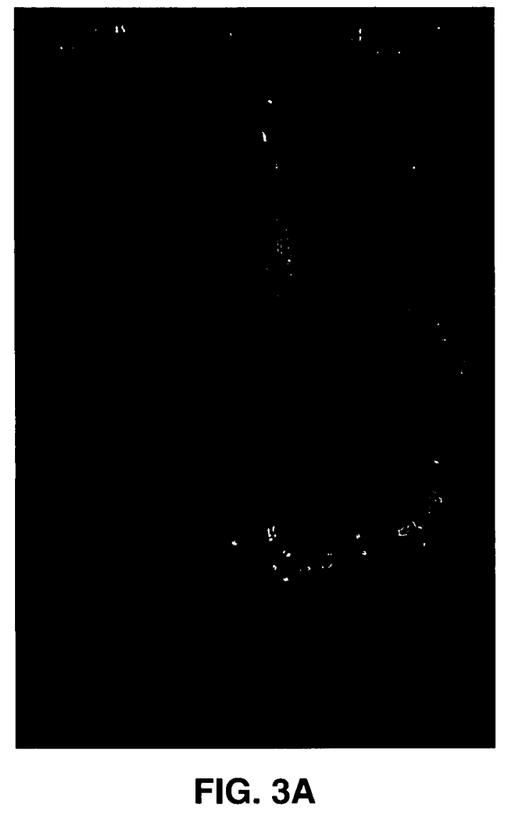
FIGS. 3A-B through FIG. 8A-B are images illustrating the present invention.
Figure 3B:
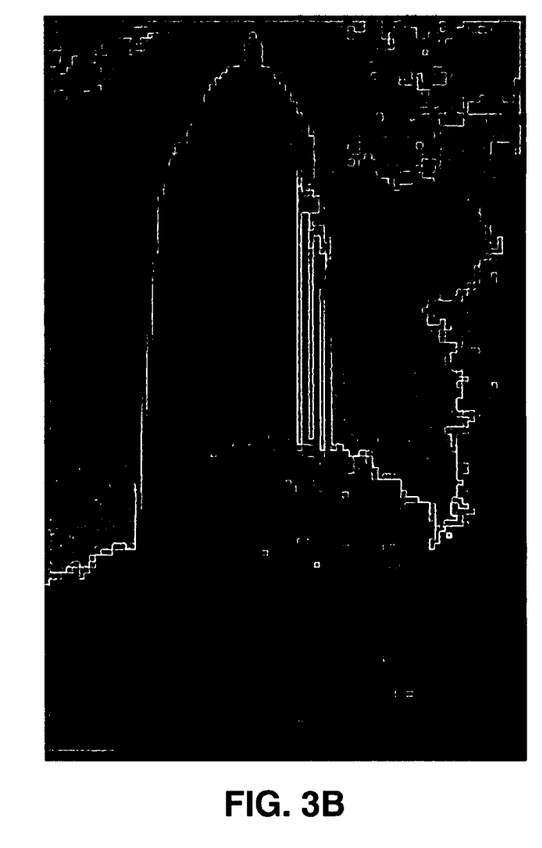
Figure 4A:
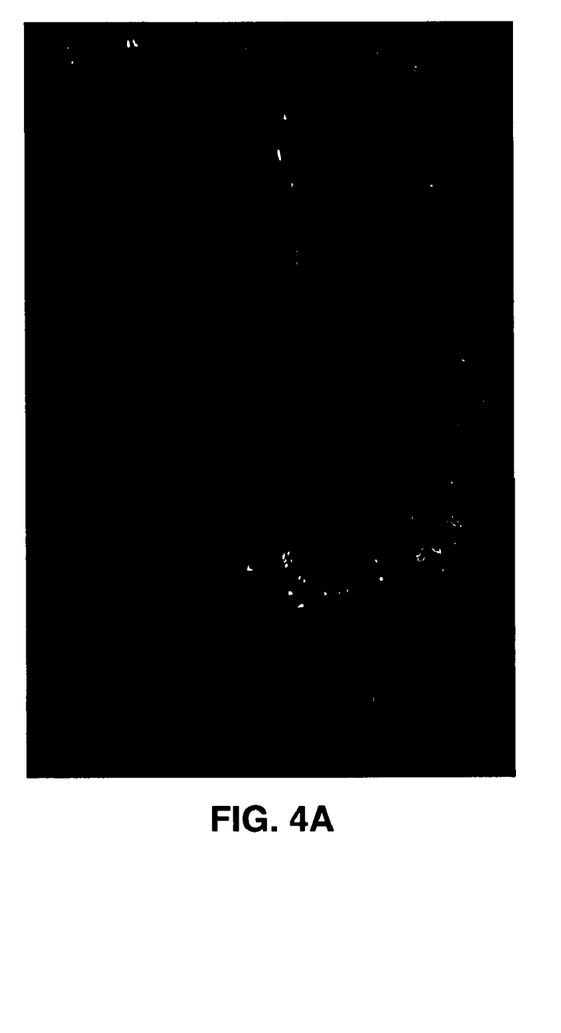
Figure 4B:
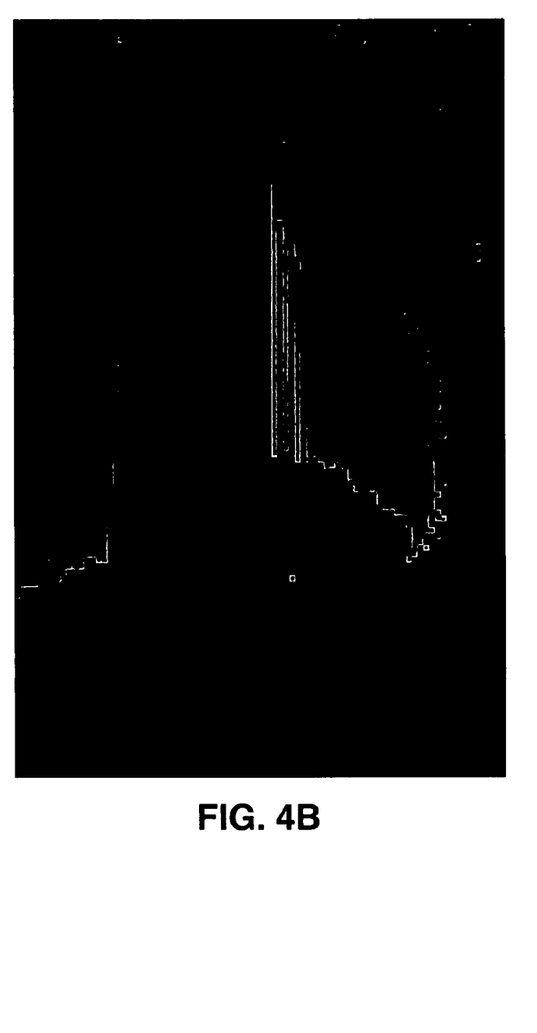
Figure 5A:
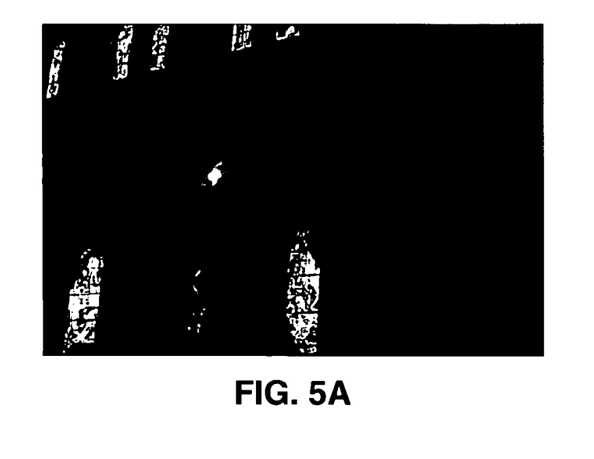
Figure 5B:
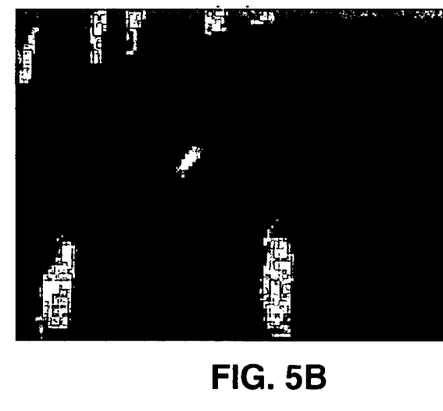
Figure 6A:
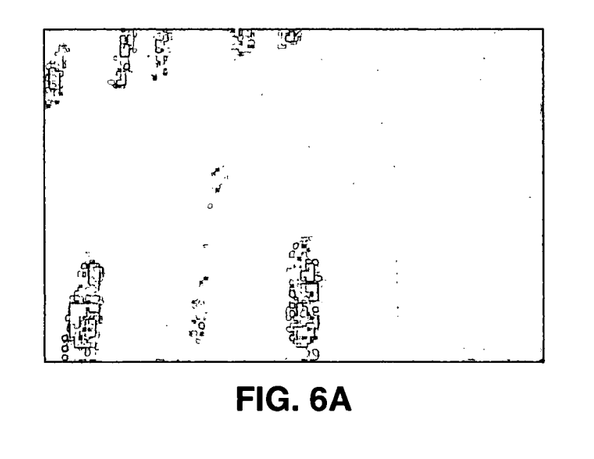
Figure 6B:
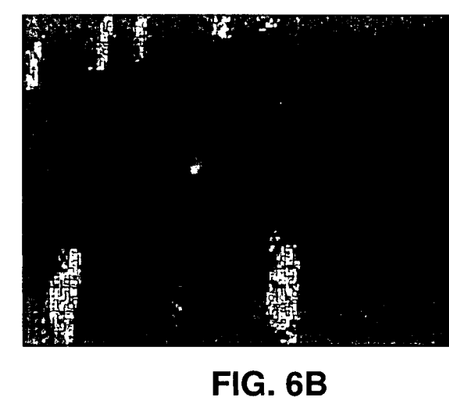

Note that, for simplicity of reproduction, all image figures shown herein are in monochrome, whereas the original images processing was performed in color. Using parameters that are "normal" for fractal compression, in the algorithm above, looks promising on the first iteration, see FIGS. 3A-B. FIG. 3A is the original image, which is a sixteen bit per pixel per plane image. FIG. 3B is the result after fractal encoding with intensity contraction of ¾ and a single decompression iteration. (A contraction of ¾ means multiply the intensity by ¾. The range of intensities, were it 0-255 before the multiplication, would now be from 0-191, so it has contracted.) The color has been corrected, but spatially the details are blurred, indicating that the spatial algorithm has not converged. Continuing to iterate immediately exposes a problem with this setting, see FIGS. 4A-B. FIG. 4A is the original image. FIG. 4B is the decompression after 4 iterations. Note that by the time the algorithm converges spatially, the image will be far too dark. The intensity contraction needs to be less in order to have the image converge spatially before it converges in intensity. Since the function encapsulated by the fractal codes converges back to the original image, iterating more than is needed to get the proper color adjustment merely returns the image to its original state. FIGS. 5A-B also show a sixteen bit image that has been compressed and decompressed using an intensity contraction of ¾. More pronounced than the example of FIGS. 3A-B, for this image a single iteration already has hidden many details. FIGS. 6A-B are based on a change of the intensity contraction to 15/16. The first iteration, FIG. 6A, looks more promising, but still, by 3 iterations, FIG. 6B, there is a darkening of the image in advance of spatial convergence. In this case, only some of the detail that actually exists in the image has been captured by the fractal compression.

One experiment was done to test the limits of this variation of the intensity contraction. If the intensity contraction were not there (contraction=1.0) one would expect that, since the conditions for convergence for the fractal decompression algorithm require a contraction in image space, the image would not decompress. However, certainly the Retinex algorithm converges, and it is buried in the intensity algorithm for the fractal/Retinex scheme. This presents a set of image diffusions: If the image is divided up into orbits, there will be two kinds: cycles, when the matched block history crosses itself again after some number of iterations, and "infinite period" cycles, the chains of blocks that do not repeat during the iteration period to decode the image (for infinite iterations, Poincare's recurrence theorem says that all but a set of measure zero of the points in the image will cycle). On each of these sets, taken as a subimage, the diffusion algorithm converges, as in the normal Retinex case, to a smooth image. Because of the reset function, and the repeated application of the differences when mapping blocks, this will converge to a scaling of the image, however slowly. The expression for a pixel in the target block becomes $$d^{new} = \frac{(d^{old} + (r^c + (r-d)))}{2}$$

where $r^c$ is the contracted substitution block, and r–d refers to the original stored difference in means. This formula is identical to the formula for pixel replacement in the McCann'99 algorithm, except that instead of an average with a manipulation of a neighboring block, the averaging is done with a similar block possibly a discontinuous jump away from the target.

Figure 7A:
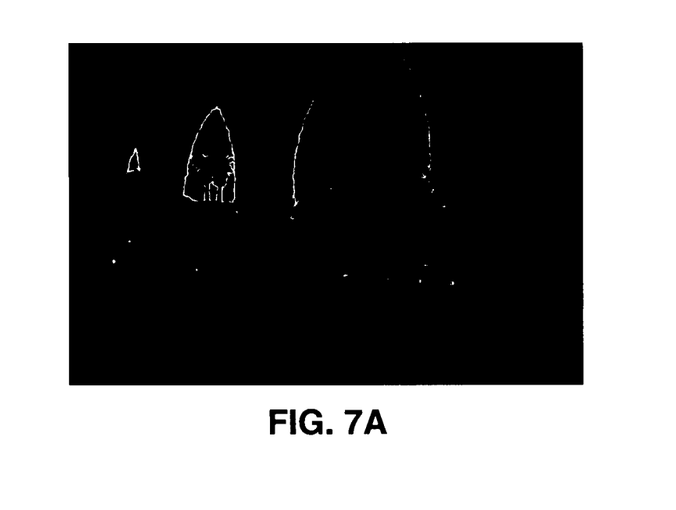
Figure 7B:
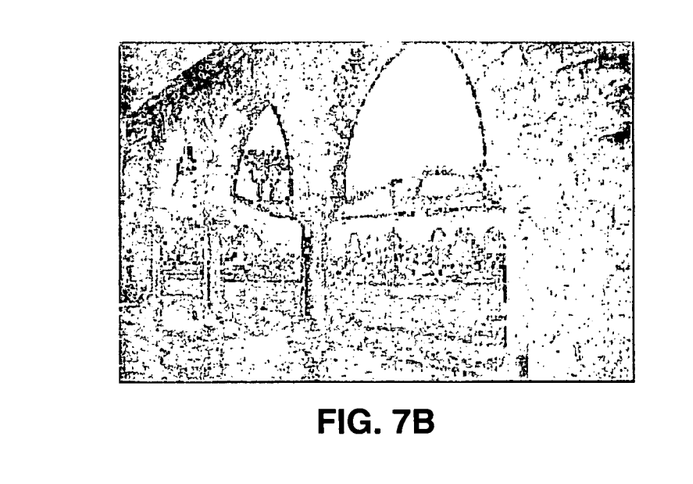
Figure 8A:
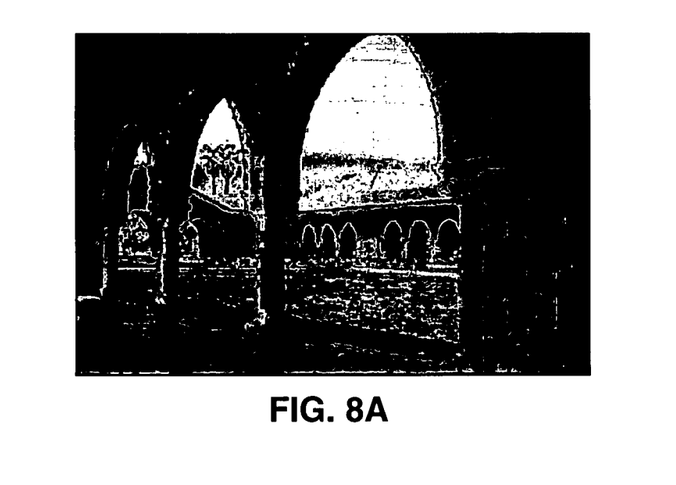
Figure 8B:
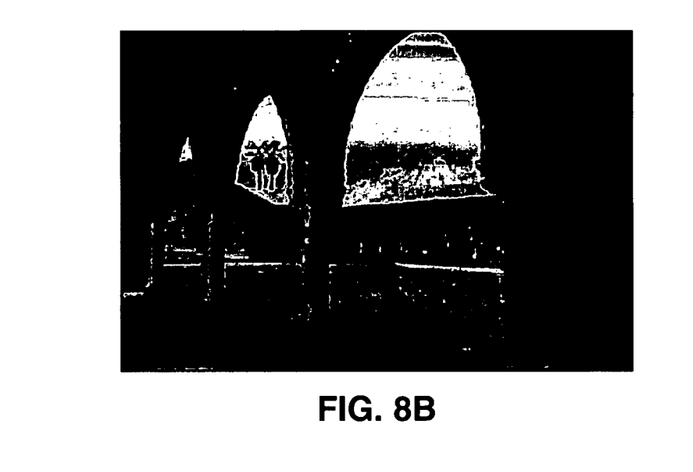

This form of the algorithm was tested. It was found that the image does indeed converge, albeit very slowly, and the spatial convergence is much faster than the intensity convergence, see FIGS. 7A-B and FIGS. 8A-B. FIG. 7A is the original image of the Stanford quadrangle. Using a contraction of 1 (i.e., no contraction) during the fractal decompression yields a spatially converged image with the intensities just beginning to move at 50 iterations, FIG. 7B. FIG. 8A is an image of the Stanford quadrangle, with a contraction of 1 in intensity, at 1000 iterations. Note—for simplicity of reproduction monochrome images are shown in the drawings. The colors are beginning to converge and the spatial information, which contracts quickly here, is already sharp. At 2000 iterations, depicted in FIG. 8B, the colors were nearly converged, with the detail in the foreground visible, and the colors of some features nearly correct. Without the contraction in the intensity directions, the spatial convergence is significantly faster than the intensity convergence. Will it converge to the recolored image properly? It should be noted that after 2000 iterations, the color of the sky was just beginning to turn blue, and the color of the flowers on the far side of the quadrangle, were seen to be clearly red. Thus, the correct colors were present, although the foreground and sky had not yet converged in these images, and the detail that is available, after the spatial convergence is nearly complete, was excellent.

Clearly, this convergence is too slow to be practical, and is done for two reasons. For the earlier images, one can see that intensity convergence of ¾ is too quick, as is 15/16. For a convergence of 1, it is too slow, so there is a factor that is between these values, that is the correct rate, at least for this image and this change in dynamic range.

The algorithm of the invention, which combines the McCann'99 Retinex algorithm with the operation of fractal compression and decompression, is interesting for several features. It does the recoloring of the image, without an assumption of piecewise smoothness, which is inherent in most color constancy algorithms. In fact, the iteration formula is discontinuous, and pixels mix only within their block orbits. Consequently, this allows a fair degree of randomness in the way that cells, for instance in the retinal ganglia, or even in the cortex must be connected. Since the algorithm essentially transmits edge information across the resolutions of the edges detected, the process could occur just as easily in a system in the cortex, for instance in V1 (Visual area 1 of the brain, also known as Area 17, the visual cortex, or the striate cortex) where edge detectors exist at many different resolutions [S. Zeki, A Vision of the Brain, Blackwell Scientific Publications, MA, 1993]. This is not to conjecture that this is where it happens, but only to make the argument that without the necessity of continuity, there are many places in which color correction can occur. On the other hand, it is obvious from the presentation of the algorithm itself, and its low continuity, that the simultaneous contrast effects of the Retinex algorithm cannot be expected. FIG. 7A-B and FIG. 8A-B, do show an early coloring of strong edges; however, this effect is much less than with standard (and more continuous) Retinex algorithms.

Additional features and alternate embodiments may also be implemented with the invention. The Frankle-McCann algorithm could be used with fractal decompression. A trick to decoding called pixel chaining [N. Lu, Fractal Imaging, Academic Press, MA, 1997], which calculates individual pixels along block orbits, could be used in the process. Narrowing the bracket of contractions for the intensity dimensions may also be done.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An image processing method, comprising:
   obtaining an image within an image processing system configured for executing program instructions from a computer readable medium or memory executed by a processor; and
   processing the image, within the image processing system, by a combination of retinex processing and fractal compression and decompression techniques.

2. The method of claim 1, wherein processing the image comprises:
   encoding the image to produce a compressed image; and
   decoding the compressed image to produce a decompressed image.

3. The method of claim 1, further comprising outputting the processed image.

4. The method of claim 1:
   wherein dynamic range of the decompressed image is controlled by the retinex processing; and
   wherein size of the decompressed image is controlled by the fractal compression and decompression.

5. The method of claim 4, further comprising:
   outputting the decompressed image to an output device;
   wherein dynamic range and size of the decompressed image are controlled to match dynamic range and resolution of the output device.

6. The method of claim 1, wherein processing the image comprises:
   replacing the image with a function which contracts the image by a spatial contraction factor q in each spatial dimension and by a color compression factor p in each color dimension, by dividing the image into image blocks, averaging each image block with a target, and selecting p to be sufficiently close to one, so that spatial components of the function converge faster than color components so that the converged image has independently controlled size and color.

7. The method of claim 1, wherein processing the image comprises:
   compressing the image by a compression algorithm which combines retinex processing with fractal compression to produce a compressed image;
   decompressing the compressed image by a decompression algorithm which combines retinex processing with fractal decompression to produce a decompressed image of a desired dynamic range and size; and
   outputting the decompressed image.

8. The method of claim 7, further comprising compressing the image by a conventional fractal compression algorithm which is modified by decreasing the compression factor in the color dimensions.

9. The method of claim 7, further comprising decompressing the image by a conventional fractal decompression algorithm which has been modified so that range blocks are averaged down and then combined with domain blocks by averaging in, using the range block values and difference as one part of the average, and the existing domain blocks as the other.

10. The method of claim 7, further comprising outputting the decompressed image to a display device or printer having a dynamic range and resolution that is matched by the dynamic range and size of the decompressed image.

11. The method of claim 7, further comprising compressing the image by:
    taking the logarithm of the whole image;
    creating a mapping screen by decimating the logarithm of the image by a factor of q in each spatial dimension and applying a contraction factor p to the intensity in each color dimension;
    matching all blocks in the image to the mapping screen; and
    recording the mapping.

12. The method of claim 11, further comprising decompressing the compressed image by:
    setting a decoding screen to a maximum value;
    decompressing each block of the compressed image by averaging the compressed block with the current value on the decoding screen;
    resetting any pixels that exceed a maximum value;
    iterating the decompressing and resetting steps until the image has converged spatially; and
    taking the anti-logarithm of the converged image.

13. The method of claim 11, further comprising:
    controlling the dynamic range of the decompressed image by the factor p; and
    controlling the size of the decompressed image by the factor q.

14. The method of claim 13, further comprising:
    outputting the decompressed image to an output device;
    wherein the dynamic range and size of the decompressed image are controlled to match the dynamic range and resolution of the output device.

15. An apparatus for processing an image, comprising:
    a processor having an input for receiving an image;
    a memory associated with the processor, the memory including:
       program instructions, which when executed by the processor, cause the processor to process the image by a combination of retinex processing and fractal compression and decompression techniques; and
       data used to process the image.

16. The apparatus of claim 15, wherein the processor comprises a digital computer.

17. The apparatus of claim 15, further comprising an output device connected to the processor.

18. The apparatus of claim 15, wherein the program instructions comprise:
   instructions for compressing the image by a compression algorithm which combines retinex processing with fractal compression to produce a compressed image; and
   instructions for decompressing the compressed image by a decompression algorithm which combines retinex processing with fractal decompression to produce a decompressed image of a desired dynamic range and size.

19. The apparatus of claim 18, further comprising:
   an output device connected to the processor to receive the decompressed image;
   wherein the dynamic range and size of the decompressed image are controlled to match the dynamic range and resolution of the output device.

20. An apparatus for processing an image, comprising:
   an encoder having an input for receiving the image and programmed to compress the image by a combined retinex and fractal compression algorithm; and
   a decoder having an input for receiving the compressed image and programmed to decompress the compressed image by a combined retinex and fractal decompression algorithm.

21. The apparatus of claim 20, further comprising a transmission element connected between the encoder and decoder to transmit the compressed image from the encoder to the decoder.

22. The apparatus of claim 20, further comprising a storage element connected between the encoder and decoder to store the compressed image from the encoder until sent to the decoder.

23. The apparatus of claim 20, further comprising an output device connected to the decoder to receive the decompressed image from the decoder.

24. An image processor, comprising:
   means for obtaining an image;
   means for processing the image by a combination of retinex processing and fractal compression and decompression techniques; and
   means for outputting the processed image.

25. The image processor of claim 24, wherein the means for processing the image comprises:
   means for encoding the image to produce a compressed image; and
   means for decoding the compressed image to produce a decompressed image.

26. The image processor of claim 24, wherein the means for processing the image comprises:
   means for compressing the image by a compression algorithm which combines retinex processing with fractal compression to produce a compressed image; and
   means for decompressing the compressed image by a decompression algorithm which combines retinex processing with fractal decompression to produce a decompressed image of a desired dynamic range and size.

27. A machine readable medium containing instructions, which when executed by a machine, cause the machine to perform operations comprising:
   processing an image, within an image processing system configured for executing program instructions executed by a processor, by a combination of retinex processing and fractal compression and decompression techniques; and
   outputting the processed image.

28. The medium of claim 27, wherein processing the image comprises:
   encoding the image to produce a compressed image; and
   decoding the compressed image to produce a decompressed image.

29. The medium of claim 27, wherein processing the image comprises:
   compressing the image by a compression algorithm which combines retinex processing with fractal compression to produce a compressed image; and
   decompressing the compressed image by a decompression algorithm which combines retinex processing with fractal decompression to produce a decompressed image of a desired dynamic range and size.

30. The medium of claim 29, wherein the image is compressed by:
   taking the logarithm of the whole image;
   creating a mapping screen by decimating the logarithm of the image by a factor of q in each spatial dimension and applying a contraction factor p to the intensity in each color dimension;
   matching all blocks in the image to the mapping screen; and
   recording the mapping.

31. The medium of claim 30, wherein the compressed image is decompressed by:
   setting a decoding screen to a maximum value;
   decompressing each block of the compressed image by averaging the compressed block with the current value on the decoding screen;
   resetting any pixels that exceed a maximum value;
   iterating the decompressing and resetting steps until the image has converged spatially; and
   taking the anti-logarithm of the converged image.

* * * * *